United States Patent
Beach et al.

(10) Patent No.: US 7,004,509 B2
(45) Date of Patent: Feb. 28, 2006

(54) JOURNAL BEARING MOUNTED HUB SEAL ROTARY JOINT

(75) Inventors: Matthew H. Beach, Richland, MI (US); Alan T. Ives, Marcellus, MI (US)

(73) Assignee: The Johnson Corporation, Three Rivers, MI (US)

( * ) Notice: Subject to any disclaimer, the term of this patent is extended or adjusted under 35 U.S.C. 154(b) by 46 days.

(21) Appl. No.: 10/363,363

(22) PCT Filed: Jul. 2, 2001

(86) PCT No.: PCT/US01/21144

§ 371 (c)(1),
(2), (4) Date: Feb. 28, 2003

(87) PCT Pub. No.: WO03/004919

PCT Pub. Date: Jan. 16, 2003

(65) Prior Publication Data

US 2004/0012199 A1    Jan. 22, 2004

(51) Int. Cl.
*G16L 27/00* (2006.01)

(52) U.S. Cl. .............. 285/281; 285/272; 277/580; 277/573

(58) Field of Classification Search ............ 285/281, 285/278, 272, 276, 280, 275; 277/579, 580, 277/581, 422, 573
See application file for complete search history.

(56) References Cited

U.S. PATENT DOCUMENTS

| | | | |
|---|---|---|---|
| 2,045,634 A | 6/1936 | Cram | |
| 2,384,281 A * | 9/1945 | Carter | 285/276 |
| 2,460,872 A | 2/1949 | Carpenter | |
| 2,580,626 A * | 1/1952 | Warren | 285/281 |
| 2,626,166 A * | 1/1953 | Fawick | 285/278 |
| 2,701,146 A * | 2/1955 | Warren | 285/275 |
| 2,805,087 A * | 9/1957 | Shaw et al. | 285/280 |
| 2,911,234 A | 11/1959 | Hieronymus | |
| 3,002,769 A * | 10/1961 | Deubler et al. | 285/276 |
| 3,017,202 A | 1/1962 | Swaney | |
| 3,411,526 A * | 11/1968 | Schaefer | 285/281 |
| 3,484,853 A | 12/1969 | Nishi | |
| 3,501,174 A | 3/1970 | Walker | |
| 3,606,394 A | 9/1971 | Maurer et al. | |
| 3,758,179 A | 9/1973 | Smith | |
| 4,754,981 A | 7/1988 | Burns | |
| 4,786,061 A | 11/1988 | Buchalla | |
| 4,817,995 A | 4/1989 | Deubler et al. | |

(Continued)

FOREIGN PATENT DOCUMENTS

AT       400 173 B       10/1995

(Continued)

*Primary Examiner*—David Bochna
(74) *Attorney, Agent, or Firm*—Young & Basile, P.C.

(57) ABSTRACT

A rotary joint comprising a stationary head including a fluid chamber therein, the chamber opening at a bottom surface of the heaf, a rotatable nipple having an outer surface and an internal axial passageway in fluid communication with the fluid chamber; and a seal member disposed on the outer surface of the nipple. The seal member comprises a rigid body including a radial flange portion having opposite first and second surfaces each carrying at least one seal, the seal of the first surface sealingly engaging the bottom surface of the head. The seal member and the nipple are radially moveable in relation to the fixed head while maintaining sealing engagement between the at least one seal of the first surface of the radial flange portion and the bottom surface of the head.

21 Claims, 3 Drawing Sheets

U.S. PATENT DOCUMENTS

Figure 3:
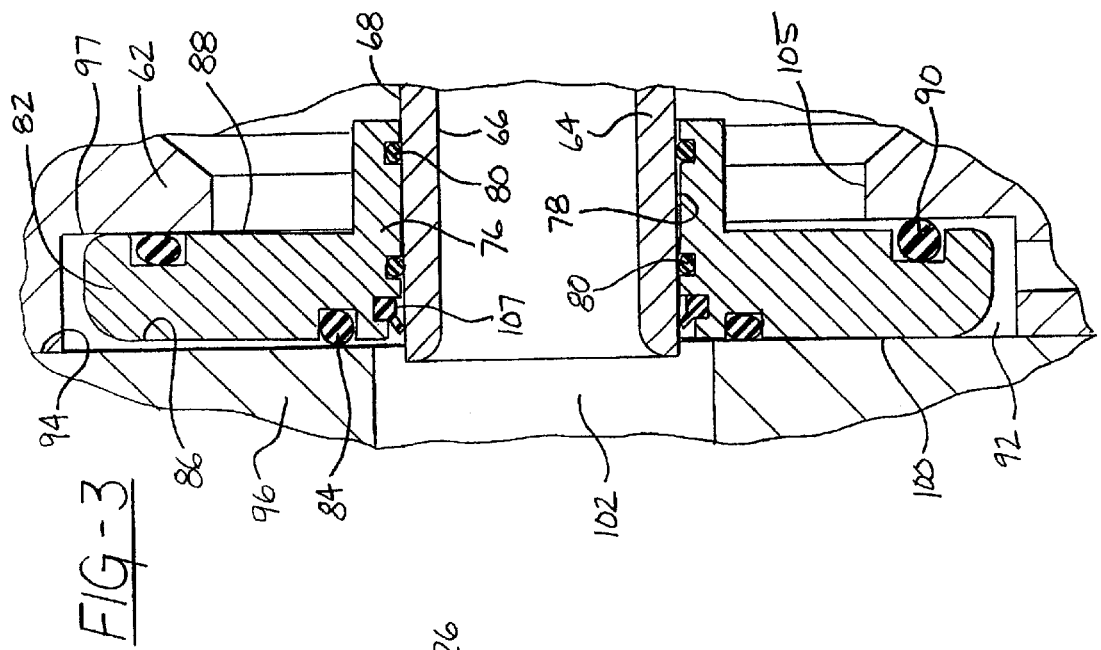

| | | | |
|---|---|---|---|
| 4,848,400 A | * | 7/1989 | Grant et al. ................ 285/276 |
| 4,928,997 A | | 5/1990 | Reisener et al. |
| 4,962,577 A | | 10/1990 | Kubik et al. |
| 5,022,686 A | | 6/1991 | Heel et al. |
| 5,052,720 A | * | 10/1991 | Yoda .......................... 285/281 |
| 5,080,401 A | * | 1/1992 | Stich .......................... 285/276 |
| 5,098,135 A | | 3/1992 | Timm |
| 5,110,162 A | | 5/1992 | Peter et al. |
| 5,209,526 A | | 5/1993 | Beccia et al. |
| 5,538,292 A | * | 7/1996 | Sommer .................... 285/276 |
| 5,617,879 A | | 4/1997 | Kubala |
| 5,669,636 A | | 9/1997 | Kubala |
| 5,992,901 A | | 11/1999 | Cohres et al. |

FOREIGN PATENT DOCUMENTS

| | | |
|---|---|---|
| AT | 000 687 U1 | 3/1996 |
| DE | DE1915231 | 10/1970 |
| DE | 2658134 | 12/1977 |
| DE | 3507819 | 9/1986 |
| DE | 29800616 U | 3/1998 |
| EP | 1 048 880 B1 | 4/2000 |

* cited by examiner

JOURNAL BEARING MOUNTED HUB SEAL ROTARY JOINT

CROSS-REFERENCE TO RELATED APPLICATIONS

This application is related to, and claims the benefit of, PCT application Serial No. US01/21144, filed Jul. 2, 2001.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

The invention pertains to rotary joints for supplying or removing a heat transfer medium relative to a rotating roll, or drum, and is of the self-aligning type to accommodate limited misalignment between stationary and rotating assembly components.

Rotary joints have long been used in manufacturing processes wherein rotating heated or cooled drums or rolls are used, for instance, in paper making, web drying, web printing, steel making, and the like, and the Assignee is a leader in the design and manufacture of rotary joints.

Rotating rolls and drums are supported upon coaxial journals that in turn are rotatably supported upon bearings that may be of the sleeve friction type, but are usually anti-friction ball or roller bearings, such as shown in Assignee's U.S. Pat. Nos. 5,303,959 and 5,931,507. Because the roll or drum may be heated to relatively high temperatures due to exterior contact of the roll with a hot moving part, or because steam is injected into the roll to heat the roll for drying a web passing thereover, the resultant high temperatures within the drum will cause the drum dimensions to vary in accordance with the roll temperature and the rotary joint must incorporate features for compensating changes in the axial length of the roll or drum during operation. The aforementioned patents show various types of sealing structure used to compensate for such axial variations. Also, due to bearing wear, bearing housing misalignment and axial bending of the roll or drum, slight misalignment between the primary axis of the rotary joint and the axis of roll rotation may occur, and the rotary joint sealing structure needs to be designed to accommodate such misalignment, as shown in Assignee's U.S. Pat. No. 4,606,561.

Rotary joints of the type illustrated in the above identified patents, and of conventional construction, utilize flexible conduits, such as synthetic or metal hose interposed between the hard supply conduits of the heat transfer medium and the rotary joint. Such flexible conduits are necessitated by the types of mounting used by rotary joints, and because of the need for the rotary joint to accommodate axial and rotative misalignment during roll and drum rotation. For many installations, the use of flexible metal hose attached to the rotary joint housing or cover structure is not satisfactory. These hoses are typically quite short, as dictated by the limited space available between the rotary joint and the machine framing. These short hoses therefore have limited flexibility and can exert large forces on the rotary joint, accelerating wear of the sealing components.

Further, in the continuous casting process of hot metal slabs wherein the hot slabs are supported by a series of metal rolls, the cooling of such rolls by water passing through the tubular rolls as supplied by a rotary joint in communication with the end of the roll has caused additional and more serious problems. Under conditions described above, the use of flexible metal hoses affixed to the rotary joints constitutes a "weak link" in the cooling of continuous casting slab supporting rolls.

As the hot metal slabs are moving upon the rolls, the slabs are very hot, having molten cores, the cast slab cores occasionally "breakout" causing molten steel to laterally flow with respect to the direction of metal slab movement, and this molten steel often damages the flexible metal hoses and conventional rotary joints. The metal hoses may become twisted, turned and forced out of operating position, and excessive external forces are applied to the rotary joint greatly reducing the rotary joint life. The rotary joints often fail in service during these molten steel breakouts and the continuous casting process must be terminated. The resultant delays and repair of damage to the flexible metal hoses and rotary joints is very expensive, difficult, and time consuming, and prior to the advent of the instant invention, a solution to the above described problem has not been forthcoming.

Rolls or drums consist of a central cylindrical portion having cylindrical journals concentrically extending from each end. Each journal is supported upon bearings, usually of the anti-friction type, and the bearings are mounted within fixed housings to provide rigid support for the bearing outer race and the associated roll or drum. With continuous casting rolls, and with any roll or drum that is to be internally cooled or heated, a rotary joint supplies the fluid heat transfer medium, usually water or steam, into the open end of the journal which communicates with the bore of the cylindrical portion of the roll or drum. The journal end is in communication with the rotary joint and through sealing means, the rotary joint is sealed to the end of the journal.

Rather than using the usual flexible metal hose to supply the heat transfer medium to a "loosely" mounted rotary joint, the joint of the subject invention is rigidly fixed, preferably inside the bearing housing, and the rotary joint housing includes passages defined therein establishing communication between the journal end and the fluid heat transfer medium that is supplied by hard piping or conduits affixed to the rotary joint housing. The hard piping to the rotary joint is possible because of the rigid fixed characteristic of the rotary joint housing.

Sealing between the roll journal and the rotary joint structure is achieved by a cylindrical nipple that is concentrically mounted on the journal and axially extends beyond the journal end. The nipple may be bolted to the journal end, or may be located within a bushing mounted in the journal end concentric with the journal bore. In each instance, the nipple rotates with the journal and roll. A hub is mounted upon the exterior surface of the nipple for axial movement thereon and sealed thereto whereby relative rotation between the hub and sleeve may occur. The hub includes a radial flange having sealing means mounted upon the inside and outside surfaces which seal against radial surfaces formed on the rotary joint structure. A limited clearance exists between the hub bore and the nipple, and the hub flange and the rotary joint sealing surfaces, whereby the use of elastomeric O-ring type sealing rings permits effective sealing even though eccentricity of journal rotation may occur. The size and character of the O-rings is such as to accommodate such misalignment and eccentricity within the elastic limits of the O-rings.

Maintenance of rotary joint structure in accord with the invention is readily accomplished in that the rotary joint housing includes an access cover in alignment with the nipple and its hub. In the embodiment wherein the nipple is mounted within a journal mounted bushing, it is possible to remove the nipple and hub as a complete assembly for replacement or resealing purposes.

Because of the ability of the seal structure to accommodate misalignment between the rotary joint and roll journal, and because the relative axial movement between the nipple and the hub permits the accommodation of axial expansion of the roll, hard piping or conduits may be directly attached to the rotary joint housing, eliminating the necessity for flexible conduits such as flexible metal hose. By the use of such rigid piping, the likelihood of damage to the rotary joint in the event of hot metal slab core "breakout" is substantially reduced over conventional rotary joints using flexible metal hoses, and the rotary joint structure of the invention permits temperature control fluids to be employed with relatively small rolls in concise and easily serviceable configurations.

Figure 1:
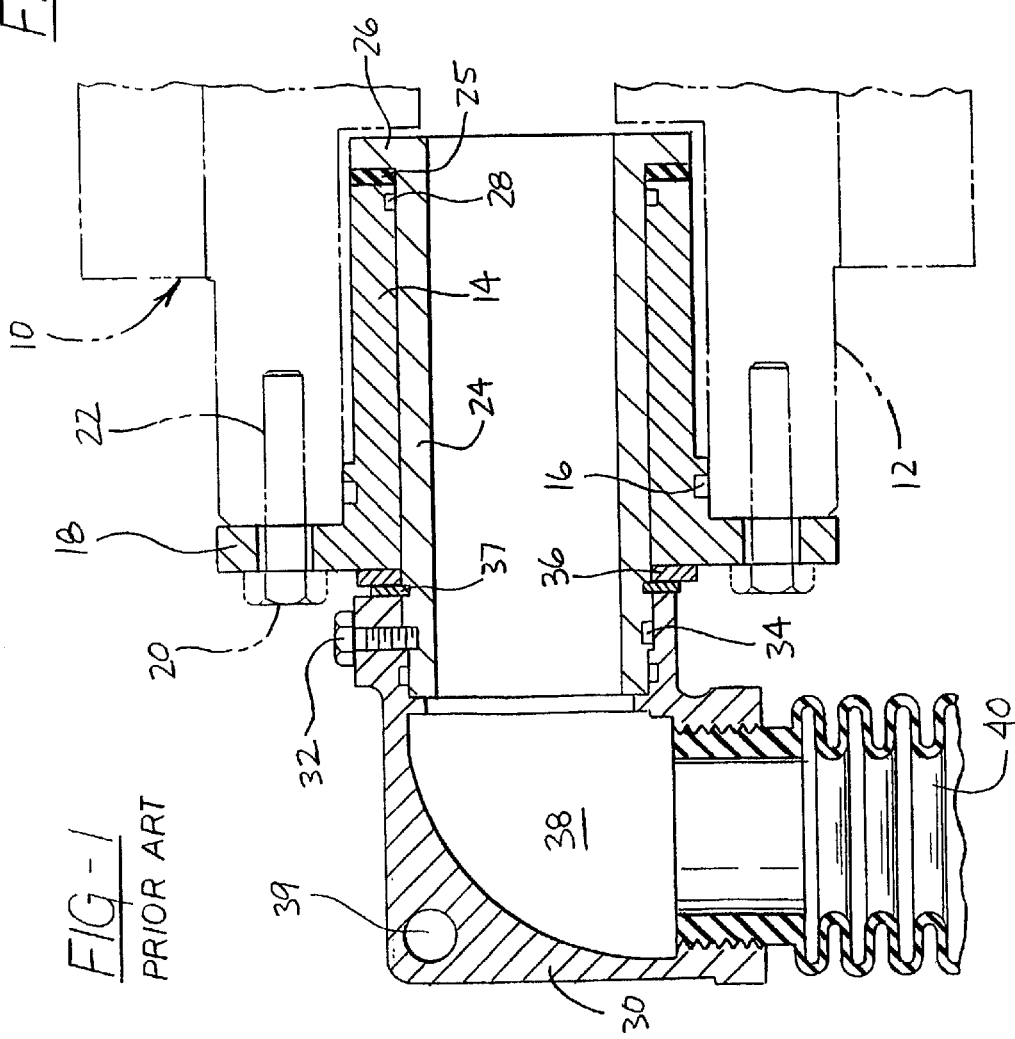
Figure 2:
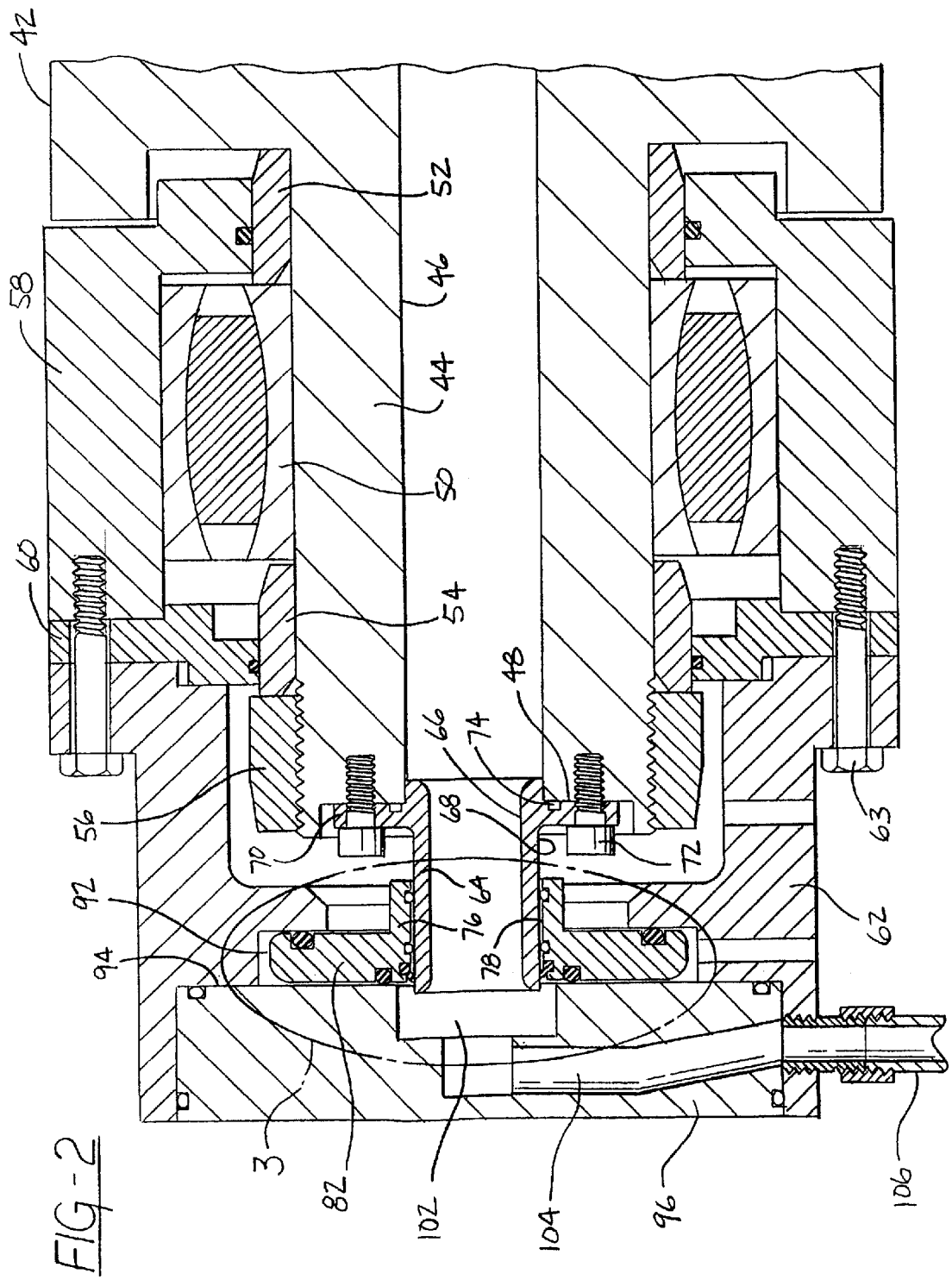
Figure 4:
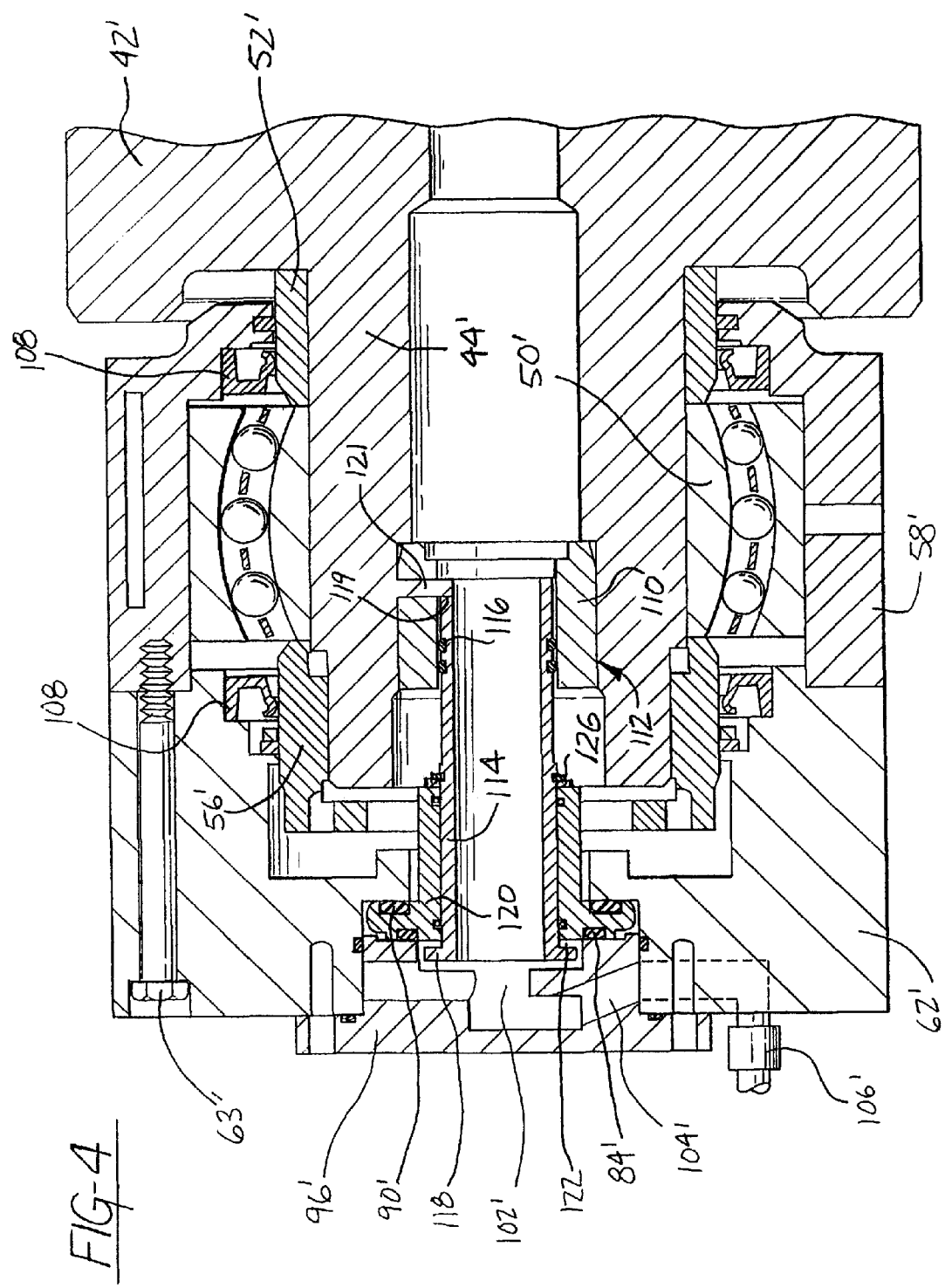

The objects and advantages of the invention will be appreciated from the following description and accompanying drawings wherein:

FIG. 1 is an elevational diametrical sectional view of the prior art type of rotary joint previously utilized with continuous casting processing rolls for cooling purposes, FIG. 2 is an elevational diametrical sectional view of a rotary joint and roll in accord with the invention, FIG. 3 is an enlarged diametrical elevational sectional view of the sleeve and its hub as represented in FIG. 2, and FIG. 4 is an elevational diametrical sectional view of another embodiment of rotary joint in accordance with the inventive concepts wherein the nipple is mounted within a bushing located within the roll journal.

FIG. 1 discloses the type of rotary joint previously employed to cool the metal rolls supporting hot metal slabs in the continuous casting process for metal slabs. The roll upon which the metal slabs are supported is shown at 10, and the roll end journals are represented at 12, the bearing supporting the journal 12 is not illustrated. The body of the prior art rotary joint is shown at 14 and is inserted into a recess defined in the journal bore concentric with the axis of roll rotation. The body 14 is sealed with respect to the journal by O-ring seal 16 and includes flange 18 through which bolts 20 extend for reception into threaded holes 22 defined in the end of the journal 12.

A tubular nipple 24 is located within the rotary joint body 14 and is of an elongated cylindrical tubular construction having an inner radially extending shoulder 26 that prevents fluid pressure from pushing the nipple out of the body 14. The shoulder 26 rides on thrust bearing 25. A seal ring 28 seals the nipple with respect to the body.

The rotary joint head is represented at 30 and is received upon the end of the nipple 24 and affixed thereto by bolt 32 received within the nipple groove 34. A thrust bearing 36 is interposed between the joint body 14 and the inner end of the joint head 30. Snap ring 37 holds the thrust bearing 36 in position. Chamber 38 is defined within the joint head 30 in communication with the outer end of the nipple 24 and the metal flexible hose 40 is attached to the joint head 30 in communication with the chamber 38 to provide the cooling heat transfer medium, such as water, to the interior of the journal 12 and roll 10. A similar rotary joint construction may be utilized at the other end of the roll 10, not shown, for removing the water from the roll after the roll heat has been transferred thereto.

The joint head 30 is connected to a fixed support structure, not shown, by a torque rod, not shown, that passes through the joint head at torque rod hole 39. The flexible torque rod means are utilized in this respect to prevent the joint head from rotating, but permits limited axial and radial movement. Because of the use of the metal flexible hose 40, and the "loose" support of the joint head 30, the rotary joint structure is able to accommodate axial expansion of the roll 10 and misalignment of the axis of roll rotation. However, in the case of a metal slab core "breakout", the flowing molten metal will directly engage the joint head 30, its support structure and the flexible hose, and often damages the flexible metal hose 40 connected to the rotary joint. These breakouts may severely damage the rotary joint and require immediate repair, which is very time consuming and expensive as the metal slab processing must be terminated until the roll is replaced or repaired.

A rotary joint using concepts of the invention is shown in sectional assembled relationship in FIG. 2. The roll is represented at 42 having a cylindrical journal 44 at its end. A bore 46 extends through the journal and through the roll. The journal outer end is recessed at 48 for receiving nipple structure as later described, and a bearing 50 supports the journal 44. The bearings 50 may be of the friction type, but are usually of the illustrated non-friction type employing spherical roller bearings. The bearing inner race is held in position by spacers 52 and 54 and the nut 56 threaded upon the end of the journal 44 squeezes the bearing inner race between the spacers to locate the bearing and journal. The bearing housing 58 is mounted upon a rigid support structure, not shown, and a bearing seal plate 60 engages the housing 58. Lip seals or the like are used to seal the bearing housing 58 with respect to the spacers 52 and 54.

The bearing cover 62 is mounted upon the stationary bearing housing 58 by threaded bolts 63, and as the bolts 63 also pass through holes in the bearing seal plate 60, these bolts will serve to position and fix the bearing seal plate and bearing cover relative to the bearing housing 58.

A nipple 64 is attached to the outer end of the journal 44 within the recess 48. The nipple 64 includes a central bore 66 communicating with the journal bore 46 and the nipple includes an outer cylindrical surface 68 and a radial flange 70 having holes defined therein for receiving the threaded bolts 72 for attaching the nipple within the recessed end 48 of the journal 44. An O-ring 74 seals the flange 70 with respect to the journal end.

Sealing with respect to the nipple 64 is achieved by the body 76 which is mounted upon the nipple outer surface 68 as will be appreciated from FIG. 3. The body 76 includes bore 78 which is several thousandths of an inch larger than the diameter of the nipple surface 68, and axially spaced quad seals 80 seal the body bore 78 with respect to the nipple outer cylindrical surface 68. A radial flange 82 is defined upon the body 76 and includes a small ID O-ring 84 received within a groove formed in the flange outer face surface 86. The flange inner face surface 88 includes a groove radially located outwardly with respect to the O-ring 84 and receives the larger ID O-ring 90.

The body flange 82 is received within a recess 92 defined in the bearing cover 62. A further bearing cover recess 94 receives the rotary joint head 96. The bearing cover recess 92 defines the radial surface 97, while the head 96 defines the head surface 100 axially spaced with respect to bearing cover recess surface 97. The axial distance between body flange surfaces 86 and 88 is slightly less than the axial dimension separating surfaces 97 and 100, as will be appreciated in FIG. 3, and whose purpose is explained below.

A chamber 102 is defined in the head 96, the head being held in position by bolts, not shown, extending therethrough received within threaded holes, not shown, in the bearing cover 62, and passages 104 are defined in the head 96 in communication with the chamber 102 whereby hard piping 106 may be affixed to the bearing cover 62 eliminating the need for flexible metal hose.

The hard piping 106 can be directly connected to the bearing cover 62 because the nipple 64 and body 76 will maintain a sealed relationship between the journal 44 and bearing cover 62 even though the length of the roll 42 increases and decreases with the temperature of the roll, and the sealed relationship with the rotary joint will be maintained if misalignment occurs between the axis of roll rotation and the general axis of the bearing cover 62.

Axial movement of the journal 44 relative to the bearing cover 62 is accommodated by the nipple 64 sliding within the body bore 78 and the quad seals 80 will maintain this sealed relationship even though relative axial displacement takes place between the nipple and body. It will be noted that the head chamber 102 is configured to accommodate such nipple displacement.

In the event of misalignment of the axes of the journal 44 and bearing cover 62, the larger size of the body bore 78 with respect to the diameter of the nipple outer surface 68 will permit a slight "tilting" of the nipple inside the body. Further tilting or misalignment will cause the body flange 82 to tilt with respect to the radial spacing defined by the body flange outer face surface 86 and the flange inner surface 88 relative to the bearing cover recess surface 97 and the head surface 100, respectively. This "tilting" of the body within the bearing cover recess 92 does not break the seal between the body flange and the head surface 100 because the seals 84 and 90 maintain engagement with the head surface 100 and bearing cover recess surface 97 due to the elastic characteristic of the O-rings 84 and 90.

The aforedescribed relationship between the nipple, body and bearing cover produces a "floating" elastically mounted body which is force-balanced. The O-rings 84 and 90 are of such dimension, and are mounted in such dimensional grooves within the body flange 82 that the body is free to deflect 1° in any axial plane. To accomplish this sealing, the O-rings are formed from a soft durometer material with large cross sections. Different combinations of O-ring inside diameter and durometer can be selected to accomplish this objective.

In the event of a molten metal blowout, the rigid mounting of the bearing cover 62 upon the bearing housing 58 will protect the end of the journal 44 from damage, and permit the rotary joint body to resist damage. Further, by the use of hard piping or conduits 106, the likelihood of the molten steel damaging the piping or conduit system is significantly reduced. For further protection, the passages can be cast into the framework with said passages in direct fluid communication with the head passages 104. Servicing of the assembly shown in FIG. 2 is readily accomplished by removing the bolts, not shown, attaching the head 96 to the bearing cover 62 so that the head 96 may be removed permitting the body 76 to be pulled from the nipple 64. The opening 105 defined in the bearing cover 62 is sufficient to provide access to the bolts 72 permitting the nipple to be removed from the journal end. Thereupon, a new nipple and body can be installed.

The ability of the quad seals 80 and O-rings 84 and 90 to maintain a sealed relationship between the body 76 and the nipple 64 and the bearing cover 62 even if a slight misalignment between the roll axis of rotation and the axis of the bearing cover exists is due to the resilient characteristic of these seals to maintain engagement with their appropriate surfaces as shown in FIG. 3. During use, O-rings are slightly compressed. Accordingly, if tilting occurs between the nipple 64 and body 76, the resilient quad seals 80 will maintain a sealed relationship to the nipple outer surface 68 as long as such tilting is within the dimensional abilities of the quad seals 80, as exaggerated in FIG. 3. Likewise, FIG. 3 shows the body flange 82 tilted with respect to the bearing cover recess 92 whereby different circumferential portions of the O-rings 84 and 90 will be compressed variable degrees, but always within the elastomeric capabilities of the O-rings to engage their associated grooves and surfaces 97 and 100. Accordingly, the disclosed nipple and body arrangement permits automatic compensation for rotative misalignment. In order to prevent contaminants in the fluid from interfering with the sealing action of quad seals 80, a lip seal 107 is provided in the body 76, sealing against the nipple outer surface 68.

FIG. 4 illustrates a variation to the aforedescribed structure wherein components similar to those previously described are indicated by primed reference numerals. The purpose of this variation is to permit the nipple and body to be removed as a unit for servicing purposes.

With reference to FIG. 4, journal 44' is supported by bearing 50' and spacer 52' and nut 56' hold the bearing in position. The bearing cover 62' attaches to the bearing housing 58' by bolts 63'. Seals 108 are interposed between the bearing housing 58' and the inner spacer 52' and the bearing cover 62' and nut 56', and it will be appreciated that the seals 108 are not of the O-ring configuration type.

A bushing 110 is slightly press fitted within the journal bushing bore 112 defined in the end of the roll journal 44'. The bushing bore 112 is of such a diameter as to closely receive the tubular bushing 110 having O-ring seals defined thereon for establishing a sealing relationship with the bushing 110. The nipple 114 includes a flanged outer end 118 and the inner end of the nipple includes a notch 119 receiving a key 121 affixed on the bushing 110 to cause rotation of the nipple 114 with the journal 44' and bushing 110. O-ring seals 116 seal the bushing 110 and nipple 114. A body 120 is rotationally movably supported upon the outer region of the nipple 114 and includes the appropriate O-rings 84' and 90' for cooperation with the bearing cover 62' and head 96' radial surfaces in the manner previously described. A thrust bearing 122 is imposed between the nipple flanged end 118 and body 120 and a snap ring 126 in a groove axially positions body 120 on nipple 114 and acts as a thrust bearing and insures that body 120 will be removed when nipple 114 is removed for servicing.

In the embodiment shown in FIG. 4, the sealing structure will accommodate both axial expansion of the roll and misalignment during rotation. The axial expansion is accommodated by the nipple 114 sliding axially inside the bushing 110. The misalignment is accommodated in the same manner as that described in FIGS. 2 and 3, with some additional misalignment capacity provided by the clearance between the nipple 114 and the bushing 110. The primary advantage of the embodiment of FIG. 4 lies in the fact that, for servicing or replacement purposes, the nipple 114 and body 120 can be removed as a unit once the head 96' is removed from the bearing cover 62'.

In the disclosed embodiment, only a single fluid path through the journal bore 46 is illustrated. However, it is to be appreciated that both embodiments of the invention may be designed by those skilled in the art wherein two conduit passages may extend through the roll. For instance, one of the passages may inject cool water into the roll, while the other passage removes the roll water that has been heated, and thereby insure cooling water circulation. This type of dual flow through a roll or drum is commonly used with heated drums wherein steam is injected through one port in the rotary joint, and the condensate is removed from another rotary joint port, as shown in the assignee's U.S. Pat. No. 5,303,959. Such modification to the disclosed embodiments is considered within the scope of this invention.

It will be appreciated that the described invention meets the intended results providing a low maintenance rotary joint capable of operating for long periods of time under the harsh conditions of a continuous casting hot metal slab mill. The elimination of flexible metal hosing eliminates a "weak link" in conventional rotary joint systems, and the unique sealing provided by the nipple and associated body accommodates slight misalignment without seal failure. Various modifications to the inventive concepts may be apparent to those skilled in the art without departing from the spirit and scope of the invention.

What is claimed is:

1. A rotary joint for connecting a conduit system to the end of a hollow journal of a tubular roll rotating about an axis of rotation comprising a tubular nipple mountable to a roll journal in substantially coaxial relationship thereto, the nipple having an outer end and a cylindrical outer surface, an annular body having a central bore slightly greater than the diameter of said nipple for receiving said nipple, a radial flange defined on said body having parallel axially spaced inner and outer radial surfaces defined thereon, a first resilient seal interposed between said nipple outer surface and said body central bore, a fixed bearing cover rigidly mountable adjacent the end of the roll journal, a chamber defined in said bearing cover having spaced first and second walls radially disposed with respect to the journal axis of rotation, said radial body flange being located between said chamber walls and having axial dimension slightly less than the axial spacing between said chamber walls, second and third resilient seals interposed between said body flange surfaces and said chamber walls, said second resilient seal interposed between said chamber second wall and said body outer surface and said third resilient seal interposed between said chamber first wall and said body inner surface, and a passage within said bearing cover in communication with said nipple outer end.

2. In a rotary joint as in claim 1, said first seal comprising resilient rings.

3. In a rotary joint as in claim 2, annular recesses defined in said body central bore, said first seal being received within said recesses.

4. In a rotary joint as in claim 1, said second and third seals comprising resilient rings.

5. In a rotary joint as in claim 4, annular recesses defined in said body radial surfaces, said second and third seals being received within said body recesses.

6. In a rotary joint as in claim 5, said annular recesses defined in said body inner and outer surfaces being at different radial distances from the roll axis of rotation.

7. In a rotary joint as in claim 1, said nipple having a radial flange, and fasteners extending through said flange affixing said nipple to the end of the roll journal.

8. In a rotary joint as in claim 1, an annular bushing adapted to be concentrically fixed with the roll journal adjacent the journal end, said nipple being received within said bushing and sealed with respect thereto.

9. A rotary joint for connecting in fluid communication a conduit system and the internal bore of a roll journal rotatably supported by at least one bearing disposed in a fixed bearing housing, the roll journal having an end enclosed by a fixed bearing cover secured to the bearing housing, the cover including a recessed opening adapted to receive the rotary joint therein, the rotary joint comprising:
   a rotatable nipple mountable to the roll journal for rotational movement therewith, the nipple having an internal axial passageway and an outer surface;
   a head receivable within the recessed opening of the fixed bearing cover and securable in fixed relation thereto, the head including at least one passageway therein for fluid communication with the internal axial passageway of the nipple;
   a seal member disposed on the outer surface of the nipple, the seal member sealingly engaging the fixed head and rotatable nipple in fluid communication, and the seal member further being sealingly engageable with the fixed bearing housing cover; and
   wherein the rotary joint is adapted to accommodate radial movement of the nipple in relation to the fixed head while maintaining sealing engagement between the seal member and each of the fixed head and the fixed bearing housing cover.

10. The rotary joint of claim 9, wherein the seal member comprises a rigid body having a bore dimensioned to be received over the nipple outer surface in sealing engagement therewith, and a radial flange portion dimensioned to be receivable in the opening of the fixed bearing cover, the radial flange portion having opposite first and second surfaces, at least one resilient seal provided on the first surface of the radial flange portion and sealingly engaging the fixed head, and at least one seal provided on the second surface of the radial flange portion and sealingly engageable with the fixed bearing housing cover.

11. The rotary joint of claim 10, wherein the bore includes at least one annular recess dimensioned to receive therein the at least one resilient seal interposed between said bore and said nipple outer surface, and wherein said at least one resilient seal comprises an O-ring.

12. The rotary joint of claim 10, wherein the first surface of the radial flange portion includes at least one annular recess dimensioned to receive therein the at least one resilient seal, the second surface of the radial flange portion includes at least one annular recess dimensioned to receive therein the at least one resilient seal, and wherein further each of said at least one resilient seals comprises an O-ring.

13. The rotary joint of claim 12, wherein the at least one annular recess in the first surface of the radial flange portion and the at least one annular recess in the second surface of the radial flange portion are positioned at different radial distances along the radial flange portion.

14. The rotary joint of claim 9, further comprising an annular bushing having an axial passageway, the nipple being received within the bushing axial passageway and sealed with respect thereto, and the bushing being receivable in the roll journal internal bore and sealable with respect thereto.

15. The rotary joint of claim 9, wherein said nipple includes a radial flange, and fasteners extending through said flange for affixing said nipple to the end of the roll journal.

16. A rotary joint comprising:
   a stationary head including a fluid chamber therein, the chamber opening at a bottom surface of the head;
   a rotatable nipple having an outer surface, and an internal axial passageway in fluid communication with the fluid chamber;

a seal member disposed on the outer surface of the nipple, the seal member comprising a rigid body including a radial flange portion having opposite first and second surfaces each carrying at least one seal, the seal of the first surface sealingly engaging the bottom surface of the head; and the seal member and the nipple being radially moveable in relation to the fixed head while maintaining sealing engagement between the at least one seal of the first surface of the radial flange portion and the bottom surface of the head.

17. The rotary joint of claim 16, wherein the seal member further comprises a bore dimensioned to be received over the nipple outer surface, the bore including at least one seal for sealingly engaging the nipple outer surface.

18. The rotary joint of claim 16, wherein each of the opposite first and second surfaces of the radial flange portion include at least one annular recess dimensioned to receive therein the respective at least one resilient seal.

19. The rotary joint of claim 18, wherein the at least one annular recess in the first surface of the radial flange portion and the at least one annular recess in the second surface of the radial flange portion are positioned at different radial distances along the radial flange portion.

20. The rotary joint of claim 16, further comprising an annular bushing having an axial passageway, the nipple being received within the bushing axial passageway and sealed with respect thereto.

21. The rotary joint of claim 16, wherein said nipple includes a radial flange having openings therethrough for receiving fasteners for securing the nipple to the end of a roll journal.

* * * * *

UNITED STATES PATENT AND TRADEMARK OFFICE
CERTIFICATE OF CORRECTION

PATENT NO. : 7,004,509 B2  
DATED : February 28, 2006  
INVENTOR(S) : Beach et al.

It is certified that error appears in the above-identified patent and that said Letters Patent is hereby corrected as shown below:

<u>Title page,</u>
Item [57], ABSTRACT,
Line 3, delete "heaf," and insert -- head; --; and <u>Column 5,</u>
Lines 33-34, delete "the seals 84 and 90" and insert -- the O-rings 84 and 90 --.

Signed and Sealed this

Twenty-fifth Day of April, 2006

JON W. DUDAS
*Director of the United States Patent and Trademark Office*